United States Patent [19]

Stollberger

[11] Patent Number: 4,471,466
[45] Date of Patent: Sep. 11, 1984

[54] APPARATUS FOR CONFORMING THE LENGTH OF A DATA STREAM THROUGH A TRANSMISSION LINE

[75] Inventor: Chris Stollberger, Smithtown, N.Y.

[73] Assignee: Allied Corporation, Morris Township, Morris County, N.J.

[21] Appl. No.: 538,849

[22] Filed: Oct. 6, 1983

Related U.S. Application Data

[63] Continuation of Ser. No. 262,012, May 11, 1981, abandoned.

[51] Int. Cl.³ .......................... G06F 3/04; G06F 7/04; H04J 3/08
[52] U.S. Cl. ........................................ 364/900; 370/86
[58] Field of Search ................... 364/200, 900; 370/86; 340/825.05

[56] References Cited

U.S. PATENT DOCUMENTS 3,681,759  8/1972  Hill ................................. 370/86 X

FOREIGN PATENT DOCUMENTS 0129816 10/1979  Japan ..................................... 370/86

OTHER PUBLICATIONS

PCT International Publication Number: WO81/004-98—Feb. 19, 1981—Western Electric Co., *Digital Loop Sync. Circuit.*
Master Clock Repeater for the Cambridge Digital Communication Ring—Leslie, IEEE Proc., vol. 128, Pt.E. No. 2—3/81—pp. 64–66.

*Primary Examiner*—Harvey E. Springborn
*Attorney, Agent, or Firm*—Joel I. Rosenblatt

[57] ABSTRACT

A data ring circulates a serial stream of data bits between ring stations. The data stream is made of packets and each station may add data to and extract data from the packets. As the number of data bits in the data stream and its length becomes longer than the electrical length of the data transmission line, it is necesssary to store the excess data bits which cannot be accommodated on the transmission line. Accordingly, a store is provided to store the excess data. When the transmission line is initially filled, the first data bit in the data stream will appear at the store. Any data phase transition is sensed and data is clocked into the store responsively. In this way, the insertion of data into the store is made responsive to the phase of the data and to the changing electrical length of the line, and the phase of the data at the store input. A clock provides an indication when all of the data has been placed on the line and responsive thereto, enables the reinsertion of data from the store to the line and contiguous with the last bit of the initially loaded data stream.

9 Claims, 9 Drawing Figures

APPARATUS FOR CONFORMING THE LENGTH OF A DATA STREAM THROUGH A TRANSMISSION LINE

This application is a continuation of application Ser. No. 262,012 filed May 11, 1981, now abandoned.

FIELD OF THE INVENTION

This invention relates to the field of data transmission and particularly to a recirculating transmission line where data is recirculated and transmitted from peripherals connected in the bus and particularly where the recirculating transmission line length may change because of temperature and because the insertion or the removal of serially placed peripherals which may introduce delays effectively increasing the line length or remove delays decreasing the line length and where the recirculating transmission line length is less than the electrical length of a data stream placed on the line requiring that the excess number of data bits in the stream be accommodated in a store.

BACKGROUND OF THE PRIOR ART

Transmission loops providing a data bus connecting several peripheral units are well known in the art.

Any suitable data format may be used within such transmission system, one example being Manchester coding. Regardless of the data format chosen, the data structure must be accurately repeated so that the proper synchronization and interpretation of the data can be accomplished by the peripherals in the loop.

In transmission systems, and especially loop transmission systems as shown in the above patent, data of a particular length is placed within a transmission system and this data is recirculated. In many cases, a data stream is placed in the transmission system. As the data stream consists of data pulses traveling within the transmission system at a known propagation rate, the system length will occupy a finite distance or physical length and its length also may be defined by the time for that data stream to pass a single point in the transmission system. In many cases, this length is longer than the electrical length of the transmission system and a portion of the data must be accommodated outside of a physical transmission line.

Additionally, as peripherals are added or taken from the line the transmission system will contract or expand. Contraction or expansion may also result from changes in temperature and from other effects which change the phase of the data signal at a data line output or input port.

SUMMARY OF THE INVENTION

A data transmission system is provided in the form of a recirculating loop. Data is transmitted around the loop in a predetermined format. Peripheral devices are connected in the transmission system and either transmit into the system for receipt by another peripheral or can receive information sent through the system by the peripheral.

The transmission system must be capable of accommodating a data stream of a definite length and must be capable of maintaining the data stream in synchronism with a reference so the data may be properly interpreted. A recirculating system should have a means for periodically verifying the data synchronization. By synchronization, the identity of each data bit location in the data stream can be ascertained and the data appearing in those locations then may be given their proper interpretation.

Further, in a data transmission system gaps should be limited and ideally there should be an absence of gaps between the end of one data bit such as at the end of the data stream and the next following bit such as at the beginning of the recirculated data stream. This requires that the data be contiguously placed on the line with the first data bit of the recirculated data stream immediately following in that location vacated by the last bit of the data stream.

In a typical installation, portions of the data transmission system will include a line or cable with a varying electrical length. The electrical length may vary due to temperature or some other extraneous influence or may change due to the addition or removal of peripherals serially in the transmission system. When the line changes electrical length, then the length of data that can be accommodated by the line changes accordingly. The phase of the data appearing at the end of the line when the line contracts will appear advanced in phase while the data appearing at the end of the line when the line expands will appear retarded in phase.

Where the length of the data stream is longer than the data line, a supplemental means must be provided for accommodating the excess data and for causing that data to be reinserted into the line in synchronism with the data stream on the line and moving through the system.

Where the system is shown to be out of synchronism, an apparatus and method is provided to reintroduce synchronism to the system and if necessary all data may be cleared from the line reentered, and by resynchronizing the data in the line.

The principles of the invention disclosed are shown through a system designed to control the length of a data stream and a number of data bits of a bit stream accommodated on a transmission line which may vary in electrical length. A data stream of finite length is loaded onto the transmission system and onto a line within the transmission system. The selected data bit locations in the data stream are synchronized relative to the timed appearance of those selected data bits. A store is provided in the system which is connected to receive the data from the line output at the store input and is connected to reinsert data back into the line input at the store output.

In the initial loading of the data, the data stream will reach a length that will be equal to the electrical length of the line. Additional data placed onto the line will then cause the initial data to be pushed into the store. As the last data bit is placed onto the line, the first data bit of the data stream will be extracted from the store and reinserted onto the line to occupy the line data location vacated by the last entered bit of the data stream. The data is reinserted from the store on the line at a clock rate related to the rate the data is loaded onto the line. In the preferred embodiment, the data is reinserted from the store at a clock rate corresponding to the rate the data is loaded onto the line. Excess data is taken off the line and inserted into the store at the received data rate, which is the same frequency as the clock rate, but varying in phase depending upon the electrical length of the line and the phase of the data at the input to the store. In the preferred embodiment, the data is reinserted from the store at a clockrate corresponding to the rate the data is loaded onto the circulating transmission line.

Accordingly, the data rate on the line is monitored and responsive to a predetermined data bit phase appearing at the output of the circulating data transmission line and at the input port of the store means, the data state of that data bit is decoded and placed in the store. The store comprises a first-in-first-out buffer. The data first in will appear first at the store output for reinsertion into the circulating transmission line input. A suitable encoder, re-encodes data state at the clock rate so the timing of the data on the line remains unchanged.

While the phase of the data at the input to the buffer may vary, compared to the phase of the data at the output, the data frequency will never vary as each data bit must be moving through the system in the same time relation to all of the data bits.

According to further principles of this invention, each data location in the data stream must be synchronized to a reference location in the data stream. That reference may be a reference data location in the data transmission at a predetermined clock time. The predetermined clock time may in turn be related to the length of the data stream and the time for the complete data stream to recirculate past a given point in the data transmission system.

In the preferred embodiment, synchronization code inserted into the first M bit positions of the N bit length data stream is observed as it recirculates about the system. That synchronization code must appear at a selected point in the transmission system at a selected time to verify the synchronization of the circulating data stream. The predetermined time may also be referred to as the time length of the transmission system and understood as the time for the length of the data stream to circulate past a given location in the data transmission system.

In the preferred embodiment, the location chosen is a comparator at the output of the store means. Where a selected data bit used for synchronization appears at the synchronization time, then the data is allowed to continue to circulate. Where nonselected data appears at the synchronization time, then an error indication of nonsynchronization error is produced. As it is most likely that the synchronization code has been distorted due to its transmission through the system, the correct synchronization code is reinserted in the proper location in the data stream and the data stream is allowed to recirculate. If a predetermined number of synchronization errors reappear, such as 8 for example, then it is assumed that the error is due to a cause other than transmission error and all data is cleared from the system and the data is reloaded.

According to the principles of the invention, a means is shown for properly loading data of a finite length into a circulating transmission system so that the data occupies the whole length of the transmission system. Additionally shown is a store means for absorbing the excess and adding the excess data back onto an electrical line which may vary in electrical length.

DESCRIPTION OF THE PREFERRED EMBODIMENT

Figure 1:
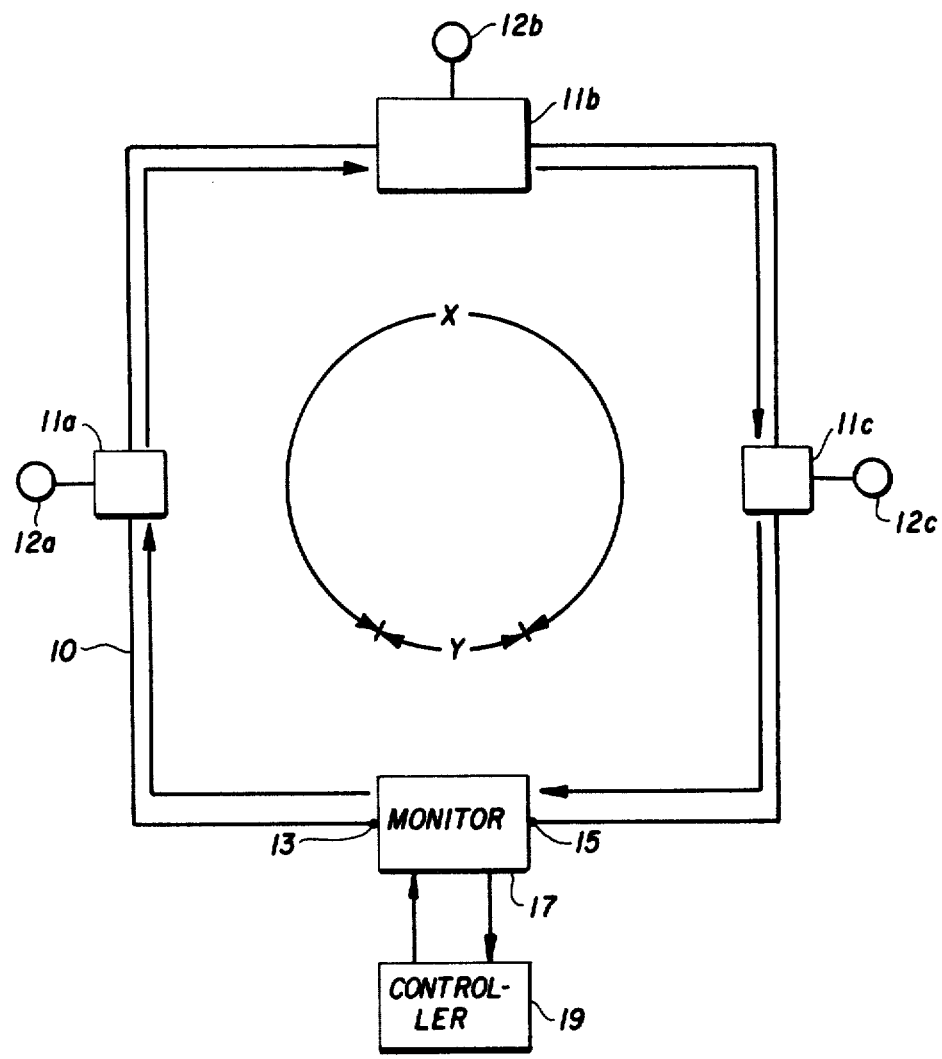
FIG. 1 shows a data transmission system in general form including a transmission line containing intraline units and a separate store.

Referring to FIG. 1, a description of the data transmission system in block form is shown. The transmission system is a ring or circulating data transmission system having a recirculating data transmission line as is well known, and operates in the known fashion by having data packets comprising data bit positions at selected locations within the data stream inserted into the line. These data packets then serve as carriers in which data intelligence may be entered together with an address of a serially located peripheral which is to receive the information. The station, upon receiving a packet with its address would then extract the information and erase the data intelligence in the packet, sending the packet around the ring for use by another serially located peripheral. The recirculating transmission line contains a line 10 having an input port 13 and extending in a clockwise direction to output port 15. Connected in the line 10 are various interface units 11a, 11b, 11c, and connected to each respective interface unit is a peripheral 12a, 12b, and 12c, for transmitting or receiving data. The line 10 has a defined electrical length between input port 13 and output port 15. The electrical length will depend upon the number of interface units inserted in the line and the actual physical length of the line as well as operating temperature and other factors which may affect its electrical length.

A monitor 17 is provided in the line. Connected to the monitor is a controller 19. The controller initially places data onto the transmission system through the monitor and verifies the synchronization of the data stream as it passes through the monitor. A store is located in the monitor.

Figure 2:
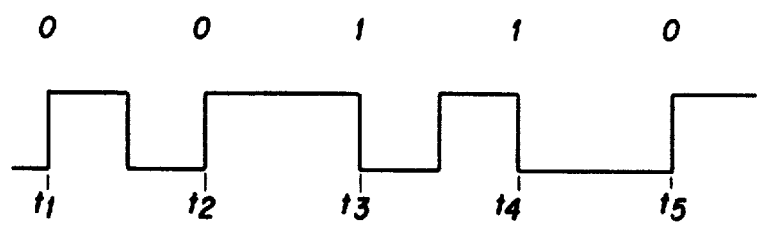
FIG. 2 shows Manchester encoded data as may be used as for example in the preferred embodiment.

The data placed on the ring may be in any desired format. For the preferred embodiment, the data is in Manchester code shown in FIG. 2, where a rising edge at bit time is a "0" and a falling edge at bit time is a "1". The bit times are shown at t1, t2, t3, t4. The period or pulse width for a data bit may be $200 \times 10^{-9}$ seconds. Where the line propagation rate is $10^{-9}$ seconds per foot, then the length of line for one bit would be 200 feet. It can be seen therefore, that each $200 \times 10^{-9}$ seconds a new bit will occupy that selected length in the line, taking the place of the data bit on that selected length in the immediately preceding data period.

If the physical length of the cable 10 in an installation is 1000 feet, then the line delay for that 1000 feet will be 5 bits.

1000 ft. × 1/200 ft. bit = 5 bits line delay where 1000 ft. is the line length.

Additional delay may be built into the line by the interface units and for the sake of explaining the principles of the invention, each interface unit is assumed to have a 2-bit delay.

The total delay in the line then between line input port 13 and output port 15 would then be 11 bits. (6 bits for units 11a–11c and 5 bits for 1000 ft. line length).

In the case of the preferred embodiment, the monitor loads data in the transmission system in the form of data packets. These packets carry the data loaded into particular data locations within the packet and send around the system to other peripherals where the information is extracted or retransmitted.

Figure 4:
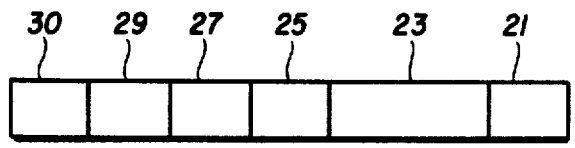
FIG. 4 shows a data stream in block form.

A typical data stream used with the preferred embodiment is as shown in FIG. 4. The data stream shown has a bit length of 328 bits comprised by a first packet section 21 containing an 8-bit presynch code, a second section contains a 64-bit synch code 23 and 4 packets of 64 bits each for conveying information from peripheral to peripheral. Each of the information packets, 25, 27, 29 and 31 contain a total of 64 bits. As is known in the art, the format of the data stream may be varied without departing from the principles of the invention.

As can be seen, at the propagation rate, a line length occupied by 328 bits would be 65,600 feet, considerably more than the 1000 feet of line available to convey the data. The delay for the electrical line of 1000 feet and 3 interline units (2-bit delay per unit) is 11 data bits. As the data stream contains 328 bits, a means must be provided for accommodating the balance of the data stream or a data stream length of 317 data bits.

The system time length is the time for a particular data bit in a data stream to pass a point in a defined transmission system. In the case of a recirculating line having a length of 65,600 feet, and propagation rate of $10^{-9}$ sec/ft., the time length is 65.6 microseconds. Referring back to the system of FIG. 1, the line electrical length is shown by the distance X and represents the amount of data which may be accommodated by the line 10 and with Y representing the balance of the data in the bit stream accommodated by a store within the monitor 17.

Figure 3:
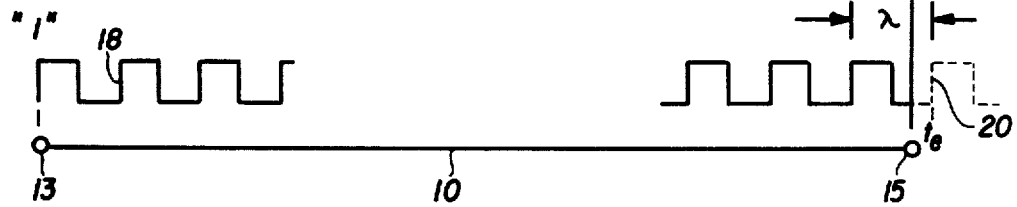
FIG. 3 shows a representation of data on the transmission line and the effect of a change in the line electrical length on the phase of the data at the end of the line.

In implementing the scheme schematically shown in FIG. 1, as each of the data bits as shown in FIG. 3 is taken off the line 10 at port 15 and placed in the store of monitor 17, a data bit is reinserted on the line at port 13 in synchronization with the removed data bit so that the line 10 is always filled with data. And so one bit propagates off the line at output port 15 into the monitor 17, a new bit is placed on the line at input port 13. The result, according to the principles of the invention is that a precise number of bits whether an integer number or a noninterger number of bits X is continually on the line 10 and equal to the instantaneous electrical length of the line. The balance of the bits Y comprised by the data stream length is contained within a store within monitor 17. The number of Y bits in the store increases in response to a contracting transmission line or decreases in response to an expanding transmission line.

Figure 5:
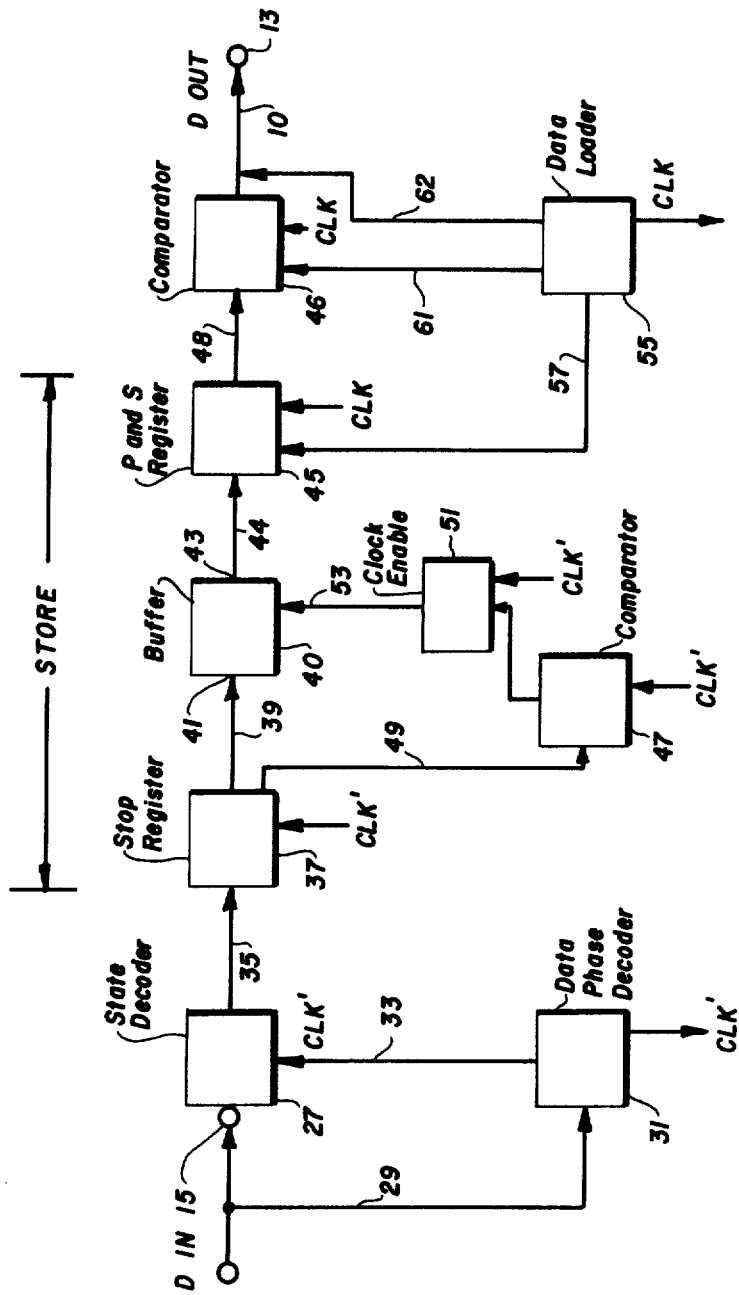
FIG. 5 shows the system in block form.

The system within monitor 17 and controller 19 for taking data bits off line 10 and for reinserting data bits on the line is shown in detail and block form in FIG. 5. As stated, FIG. 5 corresponds to the monitor 17 and controller 19. In particular, terminal 13 of FIG. 5 corresponding to terminal 13 for the monitor 17 shown in FIG. 1, and terminal 15 of FIG. 5 corresponds to terminal 15 of monitor 17 of FIG. 1. As stated, the terminal 15 on the input the terminal for data into the monitor and terminal 13 is the output terminal for data coming out of the monitor. It should be noted, however, that with reference to a recirculating transmission line, terminal 13 would be and input port into the transmission line and out of the monitor and terminal 13 would be an output port from the monitor and an input port to the transmission line. However, as would be understood by those skilled in the art, the monitor being a serially inserted peripheral would be part of the recirculating transmission line. The data from line 10 is applied to a data state decoder 27 and through line 29, to data phase decoder 31. Data phase decoder clock 31 is sensitive to the phase of the data at input port 15 and produces a timing CLK' signal on line 33 which causes the data at input port 15 to be decoded and inserted into the store 40.

In the preferred embodiment, the store comprises the buffer 40, serial to parallel register 37 and parallel to serial register 45. As is known in the art, the exact store components may be varied consistent with the principles of the invention.

The frequency of the timing signal CLK' appearing on line 33 will be the same as the frequency of the system clock signal CLK. However, the phase between CLK and CLK' may vary depending upon data rate at port 15. If line 10 had an electrical length equal to an integer number of bits, then the data phase and frequency at output port 15 and at the input port 13 at the state decoder 27 and at line input port 13 would be the same. Where the electrical length of line 10 was either longer or shorter than a full data bit, then the frequency of the data signal on line 10, at the input to the data state decoder 27 and at the input port 13 would be the same but the phase would be different. The phase difference would be that existing between the data phase appearing at outport 15 and the data phase appearing at input port 13. This is shown in FIG. 3, where Manchester encoded data is placed on the line and data bit 18 shown by a rising edge at bit time 20 is "0". Bit 18 is shown as the last data bit on the line at input port 13. The phase of the data bit at the output port 15 is $\frac{3}{4} \lambda$ where $\frac{3}{4} \lambda$ is less than the data period $\lambda$. The data phase at the input to the monitor buffer is approximately equal to $\frac{3}{4} \lambda$ such that the leading edge 20 of a "0" bit is shown in phantom as having entered the port at time $t_e$.

In the case of the preferred embodiment the clock signal CLK' on line 33, FIG. 4, provides a timing signal to transfer the data state on line 35 into the store comprising registers 37, 45 and Fifo buffer 40. Serial to parallel register 32 converts the data state from serial form at port 15 to parallel form and routes that data is parallel form through line 39 to buffer 40.

Buffer 40 in the preferred embodiment is an 8-bit wide buffer. As is known in the art, line 39 would be a set of 8 parallel lines for transferring the data accordingly. The buffer 40 is a 128×8 bit buffer and the data placed at the buffer input is transferred through the buffer to the buffer output port. In a typical 8×128 bit buffer, an 8-bit byte would require approximately 6 microseconds to transfer from the buffer input port 41 to buffer output port 43, assuming the buffer was completely empty. Where the buffer was filled, as for example where each of the 128×8 bit buffer stages were filled, and an 8-bit byte is transferred out of the buffer at port 43, as 8-bit byte is transferred in at port 41, the data transfer rate through the buffer is considerably faster than the data rate on line 10. The data from the buffer 40 is transferred on line 44 to a parallel to serial register 45 and then clocked onto the line 10 at line input port 13.

A comparator 47 is shown connected to serial to parallel register 37 by line 49. Each data byte on line 39 and in register 37 also appears at comparator 47. When the 8-bit presynch code appears in serial to parallel register 37, it appears at comparator 47, generating an enabling signal to clock enable means 51 which passes clock pulse CLk' divided by eight on to line 53 causing parallel data to be transferred from the serial to parallel register 37 into buffer store 40, through line 39.

Comparator 47 generates an indication of the time when the line 10 between input port 13 and output port 15 is initially loaded with a data stream of length X. In the preferred embodiment, when the comparator receives the 8 bit presynch code when it is loaded into register 37, the indication is produced at $t_x+8$ bits, where $t_x$ is the total time to initially load X data bits on the line 10 between input port 13 and output port 15. The comparator 47 may be placed at other locations such as at the input to register 37 without departing from the principles of the invention with the timed relation between the data and the presynch code adjusted accordingly.

Data placed in the 128×8 bit buffer 40, through input port 41, is transmitted through the buffer to its output port 43 where it appears on line 44.

Additionlly shown in FIG. 5 is a data loader 55 within monitor 17 for initially loading data onto line 10 through line 62. The data loader means may be any suitable means as known in the art and is not shown in detail here as it does not form part of the invention. The recirculating transmission line interconnects all serial stations inserted therein. A monitor such as monitor 17 shown in FIG. 1 or its equivalent establishes identifiable packets which are used to receive data and carry the data from one serially located station in the ring to another such serial station.

As data is initially loaded onto the line at input port 13, it circulates through line 10, reenters the monitor at line output port 15 and then enters buffer 40 and appears at the output port 43 of buffer 40 and on line 44. For the purpose of explanation, it is assumed that a comparator 46 has no, or a negligible delay. Where the comparator 46 has a delay, it may be added to the total delay for line 10. The data then is held at buffer outport 43 until the monitor has placed the complete data stream on the line 10. As the data stream is of a predetermined length equal to T data bits, a counter within the monitor provides a count of the data bits placed on the line and an indication of T-time equal to the time necessary for the monitor to place T data bits on line 10. A suitable timing means may be provided for this purpose as is well known in the art.

In the preferred embodiment, the data stream is shown as having a length of 328 bits. The monitor will then provide a timing state signal T when 328 bits have been placed on the line equal to the full length of the data stream. At this time, a portion of the T data bits equal to X data bits will appear on line 10 and between input port 13 of line 10 and output port 15 and the remaining portion of the data bits will be within the monitor store comprising registers 37, 45 and buffer 40.

In the preferred embodiment, an enable signal is placed on line 57 by the same data loader 55 which is used to initially load the circulating data stream onto the recirculating transmission line at port 10, and as would be well-known in the art, responsive to T time which may be one or two bit times before T time to account for delays in the system leaving sufficient time to perform additional housekeeping functions. For the sake of explanation, assume that at T time corresponding to T data bits being loaded on line 10 an enabling signal is sent on line 57 to register 45 and at T+1 the first bit of data being the first bit in the presynch code appears at line input port 13. The data is then clocked back onto the line 10 through line input port 13 at the system clock rate CLK, produced by monitor 55.

At this time, or at a subsequent time, if the accumulated clock pulses used to transfer data from register 45 to the line 10 is subtracted from the accumulated clock pulses used to transfer data into register 37, a value would be obtained equal to the number of data bits Y stored within the buffer. The total number of data bits minus the number of data bits stored equal the number of data bits X on the line 10.

At T+1 and on when data appears at line input port 13, a further comparison is made by comparator 46 with the data clocked on to line 10 and the presynch code sent by monitor 55 on line 61. If the comparison indicates that the presynch code placed on line 61 does not match the code at the output port of line 10, and an error, then the correct presynch code is forced onto the line 10 by monitor 55 and the data transmission continues.

After a predetermined number of errors, as may be indicated by a multiple counter, the error is assumed to be in the synchronization rather than a transmission error and the data within the ring is cleared and reformated starting with the loading within the comparator 46 of the presynch code and the transmission of data onto line 10 by data loader 55.

Figure 8:
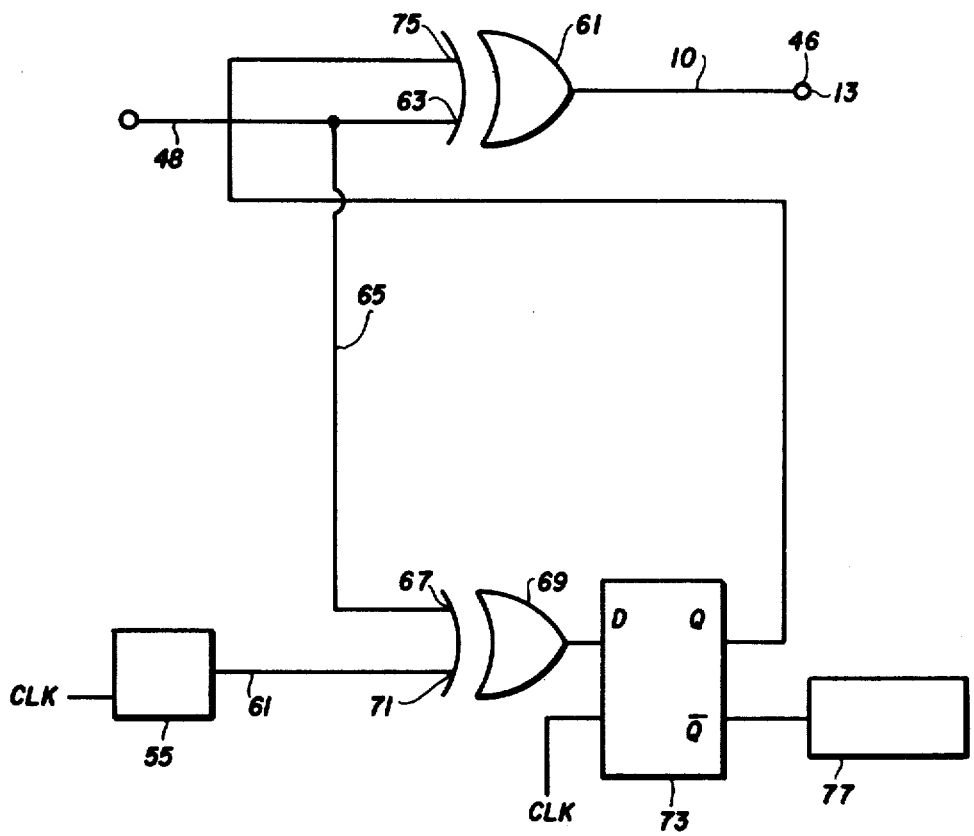
FIG. 8 is the system for verifying the synchronization of the data stream.
Figure 9:
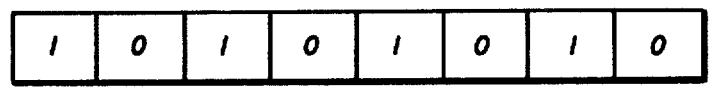
FIG. 9 is a data word such as the presynch code used in the preferred embodiment to verify the synchronization of the data stream.

A detail description of comparator 46 for forcing the correct presynch code onto the data stream and counting the number of errors is shown with regard to FIGS. 8 and 9.

Figure 6:
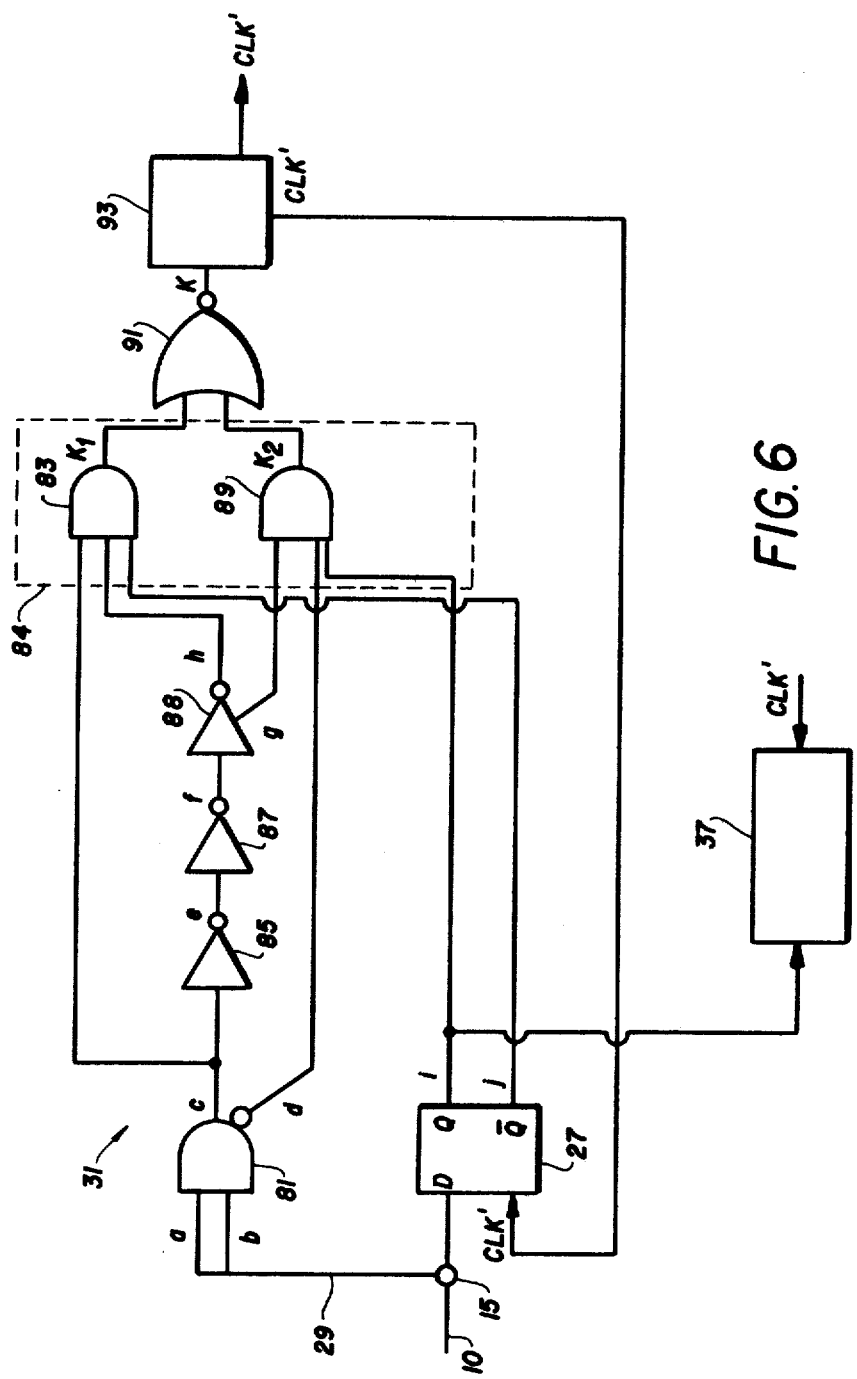
FIG. 6 shows in detail the means shown in block form within FIG. 5 for decoding the rate data is received at the store and the means transferring data at the received data rate into the store.
Figure 7:
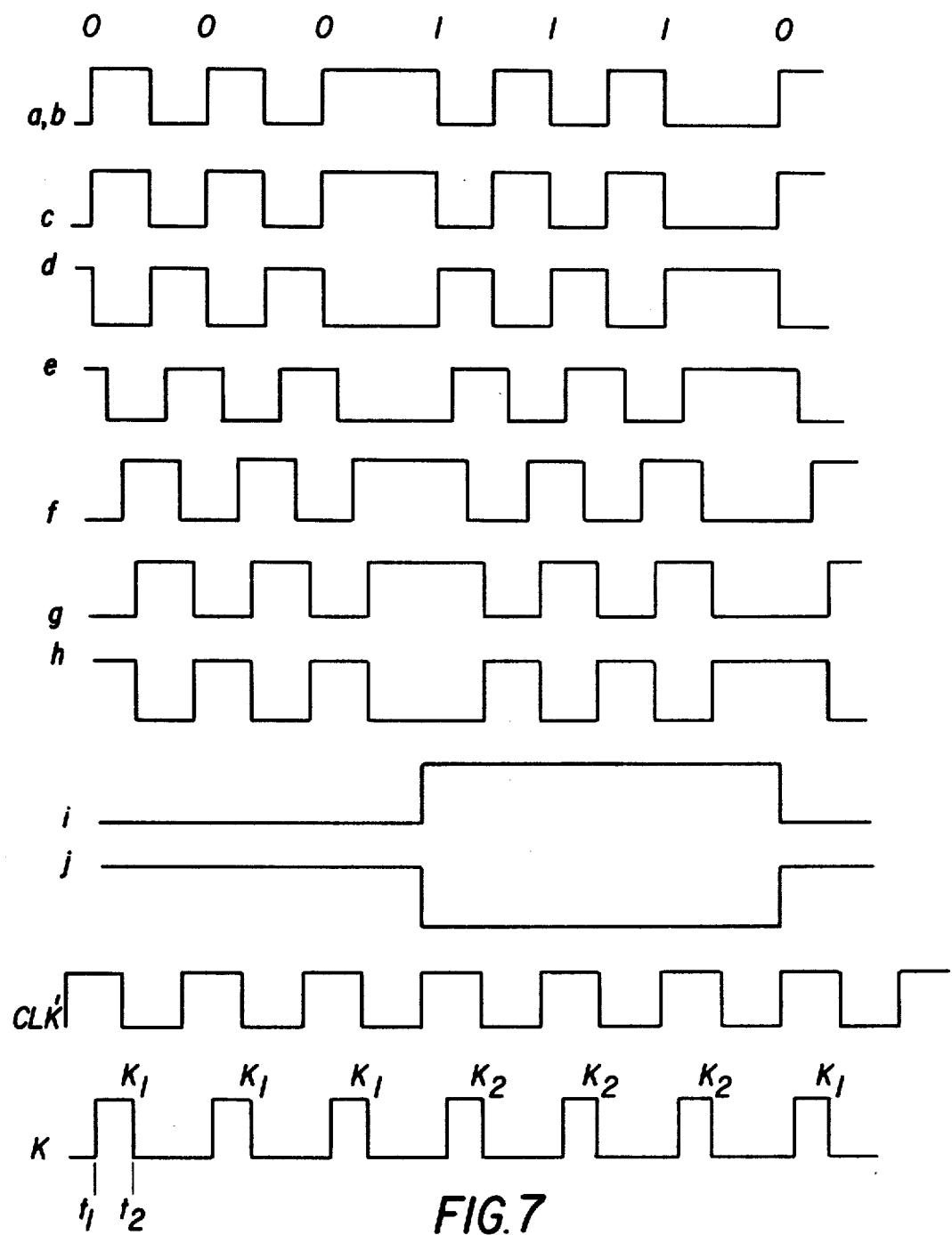
FIG. 7 is a time diagram for the circuit of FIG. 6.

Referring now to FIGS. 6 and 7, a detailed description of the means is shown for inserting data into the store responsive to the rate the data is received at the store. The data state decoder 27 and timing decoder 31 is shown generally in FIG. 5. The state decoder is shown in FIG. 6 as a D type flipflop 27 and the timing decoder is shown generally by numeral 31, with transmission line 10 shown being connected to the D terminal of state decoder 27 and to terminals A and B of and gate 81 of timing decoder 31, through line 29. The output port of transmission line 10 is connected to the timing decoder and to the state decoder input.

The data appearing at input port 15 and simultaneously at the D terminal of flipflop 27 and terminals a and b of and gate 87 is shown in FIG. 7a, b. The output of and gate 81 at terminal c is shown in FIG. 7c as a noninverted and nondelayed output while output d (FIG. 7d) is shown as an inverted nondelayed output. The output of terminal c is applied to and gate 83 of masked edge detector 84 and to the input of inverting delay device 85 where its output as shown in FIG. 7e, inverted with respect to data a, b, and delayed slightly in phase. The output at e (FIG. 7e) is then applied to inverting delay device 87 where its output at f, (FIG. 7f) appears noninverted and delayed with respect to the wave form at terminal c. The wave form at terminal f is applied to inverting delay device 88 where its delayed output at g, FIG. 7g, is applied noninverted to and gate 89 of masked edge detector 84 and where its output delayed and inverted at terminal h, FIG. 7h, is applied to gate 83 of masked edge detector 84. The inverted output wave form (FIG. 7d) at d terminal of gate 81 is also applied to and gate 89 of masked edge detector 84.

The output of and gate 83 and gate 89 of masked edge detector 84 is applied to or gate 91 and to the phase lock loop 93. The output of phase lock loop 93 is a clock signal CLK' which is applied to the clock input of D type flipflop 27 and which has the same frequency as the system CLK and is at a predetermined phase relation to the phase of the data appearing at output port 15. The state of the data appearing on terminal D of flipflop 27 is clocked to the Q and $\overline{Q}$ terminal, and appears as wave form 7i and 7j.

The data at the line output port 15 and appearing on gate 81, terminals a, b, and flipflop 27 is shown initially as "0" data. That wave form appears in the same state at terminal c and inverted at terminal d. As the masked edge detector gate 83 is responsive to a high level from terminal c, a high from terminal h, and a high from terminal $\overline{Q}$ of flipflop 27, a pulse output $7k_1$ is produced by and gate 83 and at the input of phase lock loop 93. For "0" data the duration of pulse $7k_1$ is coextensive with the duration of the high level signals produced by the output of terminal c, (7c), the output of terminal h (7h) and the $\overline{Q}$ output of the flipflop 27 (7j). That duration extends from $t_1$ to $t_2$. The pulse input to the phase lock loop 93 is then used to produce a clock signal shown as CLK' which is applied to the D type flipflop 27 and which clocks the data state on terminal D to terminal Q and to terminal $\overline{Q}$ In a similar manner, a pulse $7k_2$ is produced by gate 89 when a high is produced at terminals g, d and i. The duration of pulse $7k_2$ is also from $t_1$ to $t_2$.

It should be noted that the precise phase relation between the clock signal CLK' and the pulse output $7k$ from the masked edge detector 84 is not critical. What is important is that the clock signal CLK' be applied to the flipflop 27 in phase relation to the data on output port 15 so the data may be transferred to the register 37 at a data rate given by the rate the data appears on output port 15 and responsive to a predetermined data phase appearing at output port 15. In the preferred embodiment, the data is transferred into the serial to parallel register 37 of the store by CLK' approximately a quarter of a period before bit time.

As stated previously, data is inserted into the store responsive to the rate the data is received at line output port 15. That data rate will be the same frequency as that of the data inserted into the line and extracted from the store and reinserted on the line. The data rate is a measure of the occurrence of a predetermined data phase at line output port 15 and may differ from the phase of the data inserted on the line at input port 13. As the data rate may be defined as a predetermined phase of the data occurring at a point in the line, any change in the electrical length of the line will alter the phase of the data received at that point such as at the store. The means for inserting data into the store, comprising the data state decoder 27 and timing decoder 31 will then produce a clock signal CLK' responsive to the data rate appearing at the line output port 15, and at the store input, and insert the data into the store responsive to the data rate responsive clock signal CLK'.

Referring now to FIGS. 8 and 9, the means for verifying the synchronization of the data shown generally by numeral 46 in FIG. 5 is shown in greater detail.

The presynch code as shown in FIG. 9 may be a series of alternate "1"s or "0"s, or any other suitable arrangement of data bits occupying selected bit positions such as 0 through 7 in the data stream.

As explained above, at T time, the full length of the data stream has been placed on the line by monitor 55, and then the data is clocked out of the store's parallel to serial shift register 45. As stated previously, the time length of the system is the time for the data stream to pass a point in the transmission system. As the data stream is synchronized with the system clock CLK, it is possible to predict the location of selected data bit positions at a selected point in the transmission system.

In the preferred embodiment, that point is the comparator shown as 46 in FIG. 5 and shown in detail in FIG. 8.

The presynch code portion shown in FIG. 9 and occupying data bit positions 0 through 7 of the data stream is used to verify the synchronization of data stream and that selected bits appear at a selected point in the transmission system at a predetermined time.

Where the first data bit for the 0 bit position of the presynch code received on line 48 is a "0" at time T+1, that data bit value will be impressed upon terminal 67 of exclusive or gate 69. Where the correct data bit value for that presynch code bit position is a "0" then the data loader 55 will produce a "0" on terminal 71 for the data bit position. Where a "0" appears on terminal 67 and a "0" on terminal 71, then the output of exclusive or gate 69 would be a "0" which would be translated to the Q terminal and to terminal 75 serving as an input to exclusive or gate 61.

As a "0" appears on terminal 75 and a "0" appears on terminal 63, the output at exclusive or gate 61 is a "0" consistent with the synchronized presynch code 0 bit position.

Where a "1" appears on terminal 63 but the correct presynch data value is a "0" and a "0" bit appears on terminal 71, as produced by data loader 55, then the output of exclusive or gate 69 will be a "1", which will be translated to the Q output of D flipflop 73 and to the input terminal 75 of exclusive or gate 61 causing the data state on terminal 63 to be flipped to produce a "0" reflecting the correct data bit value as shown by the presynch code bit value simultaneously produced by data loader 55. As the data value of the Q terminal changes, so will the data value of the $\overline{Q}$ terminal causing an increment in the count register in register 77.

At time T+2 the second bit of the data stream is clocked out of register 45 of the store and appears at terminal 63 of exclusive or gate 61. The data appearing on terminal 63 is applied through line 65 to terminal 67 of exclusive or gate 69. At time T+2, monitor 55 applies a data bit on line 71 of exclusive or gate 69 corresponding to the value of the second bit position of the presynch code shown in FIG. 9.

If the presynch code data bit produced by data loader 55 on terminal 71 is the same as presynch code data bit on terminal 67, i.e., "1", then the output of exclusive or gate 69 will be a "0" or low. That output is received by the D terminal of the D type flipflop 73 and clocked to the Q terminal where it apears as a "0" bit on terminal 75 of exclusive or gate 61. As the "0" bit on terminal 75 does not cause a change in the output of exclusive or gate 61, the "1" data bit appearing in the second bit position of the data stream of terminal 63 is then translated at the output of exclusive or gate 61 as a "1" after comparison with the same value data bit produced by data loader 55 on terminal 71 of exclusive or gate 69.

Where the data bit produced by data loader 55 is a "1" indicative of an error when compared with a "0" on terminal 63, the output of exclusive or gate 69 will be "1" or high which will be translated as a "1" at the Q output of flipflop 73 and "1" input to terminal 75 of exclusive or gate 61. The "1" on terminal 75 will cause the or gate 61 to flip the data bit on its other terminal 63, forcing a "1" bit on the output of or gate 61 and correcting the error appearing in the 1 bit position of the presynch code.

As the data state of the Q output of the D type flipflop changes due to an error, the data state at the $\bar{Q}$ output of the D type flipflop will similarly change producing a pulse to counter 77 and generating a presynch error count in register 77.

The synchronizing means forces a "1" bit to be combined with the presynch code on terminal 63 whenever an error appears, flipping the data bit value transmitted to line 10 to its proper value.

The counter may be used to generate an enable signal responsive to a predetermined number of errors such as 8. After said number of errors, the line may be cleared of all data and reloaded as described above. The predetermined error number may be sufficiently large to establish a time synchronization error.

The monitor and controller and their interrelated functions such as initially generating and loading data on to the line 10, the removal of data from the line, generation of timing state signals and other functions generally associated with a data ring and which do not form part of the invention are not shown in a functional block diagram. The monitor 17 and controller are shown as separate units for the purpose of explanation but may be combined into a single unit as in the case of the preferred embodiment.

The principles of this invention should not be thought of as limited by the foregoing description of the preferred embodiment.

I claim:

1. An apparatus for accommodating a circulating data stream having an electrical length of N data bits, wherein the last bit is the Nth bit, on a recirculating loop transmission line having a front (input) and an end (output) and an electrical length of Y bits, and wherein the said Y bits are less than said N bits, by maintaining a store of N minus data bits corresponding to the excess number of bits in said circulating data stream which cannot be accommodated on said recirculating loop transmission line, comprising:
    (a) first loading means (55) for serially loading said data stream of N bits into the front of said recirculating loop transmission line at a predetermined data rate,
    (b) first in first out storage means (37, 40, 45) having an input and an output and connected to said transmission line for receiving said recirculating data at its input and transmitting said recirculating data to its output,
    (c) data phase decoder means (31) connected to the end of said recirculating loop transmission line for receiving said circulating data stream at an output thereof and providing a first indication of the times of arrival of the first data bit and of successive data bits in said circulating data stream at the end of said recirculating loop transmission line and at the input of said data phase decoder means,
    (e) state decoder means (27) connected to said data phase decoder means (31) and responsive to said first indication from said data phase decoder means (31) for transferring the state value of the said first and of the said successive data bits from the said recirculating loop transmission line to the input of said storage means (37, 40, 45),
    (e) said storage means including second loading means (37) connected to an output of said state decoder means (27) and connected to receive said state of said first and successive data bits and said first indication for loading said data bits into said storage means in response to said first indication.

2. The apparatus of claim 1, wherein said:
    (a) loading means (55) includes timing means for providing a second indication (T) when said loading means (55) has loaded the Nth bit of said circulating data stream onto said recirculating loop transmission line,
    (b) said storage means including unloading means (45) connected to receive said second indication (T) and being responsive thereto for unloading said circulating data from said storage means and into the front of said recirculating loop transmission line.

3. The apparatus of claim 2, wherein said first loading means (55) loads each of said N data bits contiguously with each of the other data bits loaded on said line, and
    said unloading means (45) unloads each said data bit from said storage means contiguously with each preceding data bit unloaded from said storage means and onto said recirculating loop transmission line.

4. The apparatus of claim 3, wherein:
    said circulating data stream contains a synchronization code located in the first M bit positions of said circulating data stream,
    comparator means (47) connected to said second loading means (37), said comparator means (47) comparing said data bit values in said second loading means (37) and providing an enable signal when said second loading means data bit values correspond to said synchronization code,
    said store including a buffer (46) connected to receive said enable signal and responsive thereto causing said circulating data stream to be shifted from said loading means (37) to said buffer (40).

5. The apparatus of claim 2, wherein said circulating data stream has a synchronization code located at the first M bit positions of said circulating data stream, a comparator means (45) connected to said loading means (55) and to said unloading means (45) for receiving said circulating data stream containing said synchronization code and for receiving said synchronization code from said loading means at a predetermined time corresponding to the expected time of arrival of said M bit positions comparator at said data rate at said comparator (45) for verifying the synchronization of said data stream, said comparator sequentially comparing the value of each data bit position in said synchronization code provided by said loading means with corresponding bit position values in said recirculating data stream code and responsive to a match occurring therefrom, passing said circulating data stream bits into the input of said recirculating transmission line and responsive to a match not occurring therefrom passing said corresponding synchronization code bit value into the input of said recirculating transmission line.

6. The apparatus of claim 5, wherein said comparator 45 generates an error signal in response to a said match not occurring.

7. The apparatus of claim 6, including a register means connected to receive said error signal and clearing means connected to said register and to said data loading means for clearing the data from the line and reloading the data in response to a predetermined number of error signals.

8. The apparatus of claim 1, wherein said data phase decoder means includes sensing means (81, 85, 87, 88, 84) for sensing the presence of a predetermined phase of a said data bit and for generating said first indication in response to the presence of said data bit predetermined phase at the said input to said time decoder means.

9. The apparatus of claim 1, wherein said storage means has means for providing a propagation rate from an input to an output thereof greater than the propagation rate of said recirculating transmission line.

* * * * *